J. P. SCUDDER.

Potato-Planter.

No. 65,695.

Patented June 11, 1867.

Witnesses:
Theo. Trische.
J. A. Service.

Inventor:
John C. Scudder

United States Patent Office.

JOHN P. SCUDDER, OF LAWRENCEVILLE, NEW JERSEY.

Letters Patent No. 65,695, dated June 11, 1867.

POTATO-PLANTER.

*The Schedule referred to in these Letters Patent and making part of the same.*

TO ALL WHOM IT MAY CONCERN:

Be it known that I, JOHN P. SCUDDER, of Lawrenceville, in the county of Mercer, and State of New Jersey, have invented a new and improved Potato-Planter; and I do hereby declare that the following is a full, clear, and exact description thereof, which will enable others skilled in the art to make and use the same, reference being had to the accompanying drawings, forming part of this specification, in which—

Similar letters of reference indicate like parts.

This invention relates to a machine by which potatoes can be planted in furrows at suitable intervals, said machine being so constructed and arranged that the plough for making the furrow can be instantly raised out of the ground, and that the discharge of the potatoes can be instantly stopped whenever desired, for turning corners and other purposes.

The invention consists chiefly in the application of an inclined stationary cylindrical pan, in which a revolving central shaft, carrying a series of scoops, is arranged, by which scoops the potatoes are carried to an aperture in the bottom or side of said cylinder, through which they are dropped. The said aperture can be closed by a valve, which is operated by a string extending to the driver's seat. The plough, by which the furrow is made, is hinged to the under side of the frame on which the machine is held, and can be operated from the driver's seat by a rod which is pivoted to the plough-standard, so that the plough can be raised out of ground or depressed, as may be desired.

Figure 1:
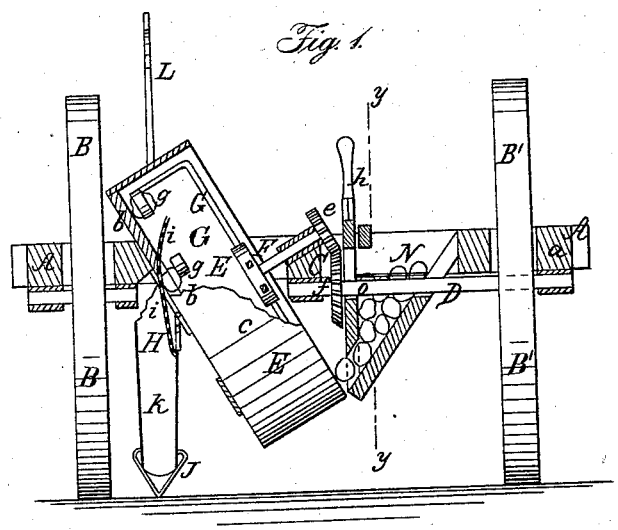
Figure 1 represents a vertical cross-section of my improved potato-planter, the plane of section being indicated by the line $x\ x$, fig. 2.
Figure 2:
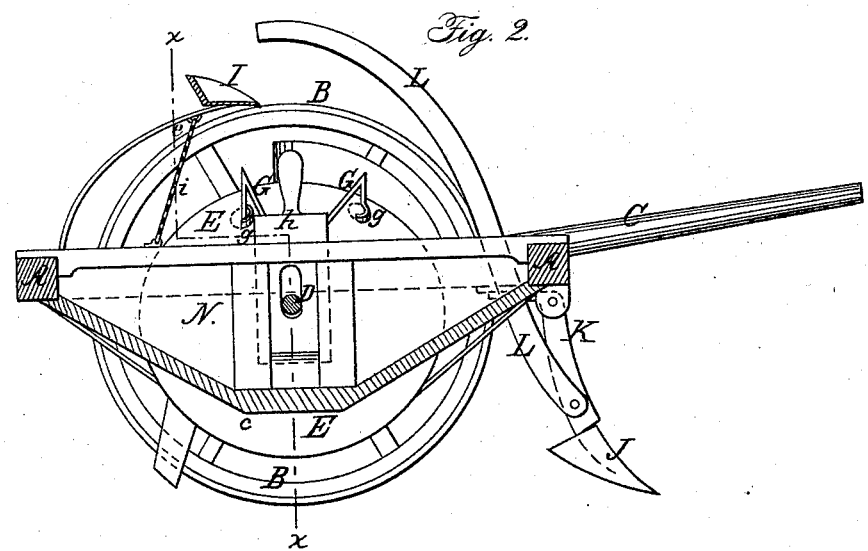
Figure 2 is a vertical longitudinal section of the same, the plane of section being indicated by the line $y\ y$, fig. 1.

A represents a rectangular frame, made of wood or other suitable material, of sufficient strength to support the working parts of the machine. B B′ are two wheels, which are arranged on the sides of the machine, and which are hung on separate axles, as shown. C is the tongue of the machine, which extends back to the rear end of the frame. The axle D of the wheel B′ has its bearings in the outer bar $a$ at the right-hand side of the frame and in the tongue C, as is clearly shown in fig. 1, and revolves with the wheel. E is a cylindrical tub or vessel, which has a wooden bottom, $b$, and a sheet-metal or other rim, $c$, as shown. It is firmly secured in the frame A, between the tongue C and a longitudinal brace, $d$, in an oblique position, as is clearly shown in fig. 1. A shaft, F, has its bearing in the centre of the circular bottom $b$ and in the tongue C, or in the latter only, as shown, said shaft being inclined, as shown, passing through the centre of the tub E. On its upper end is mounted a pinion, $e$, which meshes into a gear-wheel, $f$, on the shaft D. Thus, as the machine is drawn forward the wheels revolve, and also the shaft D, and thereby the shaft F is also revolved. To the shaft F is secured a series of radiant arms or bars, G, the ends of which are bent so as to form (or are provided with) scoops, $g$, as shown. N is a hopper, which is arranged on the right-hand side of the cylinder E, opposite to and above the lower part of the same. In the upright partition, which separates the said hopper from the cylinder, is arranged a sliding-gate, $h$. The potatoes are placed into the hopper and the gate $h$ is opened. The potatoes drop through the gate into the cylinder, and are then taken by the scoops $g$ (each of which will just hold one seed) towards the upper portion of the cylinder. In the upper part of the inclined bottom of the cylinder is an opening, which may be closed by a hinged lid or valve, H, from which a cord, $i$, extends to the driver's seat I. When the valve is open the potatoes will be carried by the scoops until they fall through the aperture in the bottom of the cylinder to the ground. They are guided in their fall by a tube or semi-tubular plate, R, which is arranged on the under side of the frame, as shown. By closing the gate $h$ on the valve H the further discharge of potatoes may be instantly stopped. J is a plough of suitable form and construction, the standard K of which is hinged to the under side of the frame in front of the tube R. The lower end of a rod, L, is hinged to the standard K, as shown. By means of this rod L the plough J can be easily raised out of or forced into the ground.

What I claim as new, and desire to secure by Letters Patent, is—

1. The inclined cylinder E, in combination with the revolving scoops $g$ and adjustable valve H, all made and operating substantially as herein shown and described.

2. The hopper N and gate $h$, in combination with the inclined cylinder E, scoops $g$, and valve H, all made and operating substantially as herein shown and described.

3. The adjustable plough J, in combination with the inclined cylinder scoops $g$ and valve H, all made and operating substantially as herein shown and described.

JOHN P. SCUDDER.

Witnesses:
 CHARLES B. ATCHLEY,
 JOHN H. BLACK.